(12) United States Patent
Shafer

(10) Patent No.: US 7,054,901 B2
(45) Date of Patent: *May 30, 2006

(54) NETWORK MANAGEMENT INTERFACE WITH SELECTIVE RENDERING OF OUTPUT

(75) Inventor: Philip Shafer, Raleigh, NC (US)

(73) Assignee: Juniper Networks, Inc., Sunnyvale, CA (US)

( * ) Notice: Subject to any disclaimer, the term of this patent is extended or adjusted under 35 U.S.C. 154(b) by 845 days.

This patent is subject to a terminal disclaimer.

(21) Appl. No.: 09/871,046

(22) Filed: May 31, 2001

(65) Prior Publication Data

US 2002/0198974 A1 Dec. 26, 2002

(51) Int. Cl.
*G06F 15/16* (2006.01)

(52) U.S. Cl. .............. 709/203; 709/217; 709/218; 709/224; 709/227; 709/310; 707/2; 705/14

(58) Field of Classification Search ............. 709/217, 709/218, 224, 227, 310, 203; 707/2; 705/14
See application file for complete search history.

(56) References Cited

U.S. PATENT DOCUMENTS

| | | | | |
|---|---|---|---|---|
| 5,835,710 A * | 11/1998 | Nagami et al. | ............. | 709/250 |
| 5,937,393 A * | 8/1999 | O'Leary et al. | ............. | 705/21 |
| 5,964,844 A * | 10/1999 | Rosenthal | ............. | 719/310 |
| 6,108,701 A * | 8/2000 | Davies et al. | ............. | 709/224 |
| 6,167,446 A * | 12/2000 | Lister et al. | ............. | 709/223 |
| 6,212,559 B1 * | 4/2001 | Bixler et al. | ............. | 709/221 |
| 6,279,038 B1 * | 8/2001 | Hogan et al. | ............. | 709/224 |
| 6,282,575 B1 * | 8/2001 | Lin et al. | ............. | 709/244 |
| 6,335,919 B1 * | 1/2002 | Maegawa | ............. | 370/254 |
| 6,393,415 B1 * | 5/2002 | Getchius et al. | ............. | 707/2 |
| 6,434,543 B1 * | 8/2002 | Goldberg et al. | ............. | 707/2 |
| 6,438,594 B1 * | 8/2002 | Bowman-Amuah | ............. | 709/225 |
| 6,510,434 B1 * | 1/2003 | Anderson et al. | ............. | 707/100 |
| 6,553,568 B1 * | 4/2003 | Fijolek et al. | ............. | 725/111 |
| 6,585,778 B1 * | 7/2003 | Hind et al. | ............. | 715/513 |
| 6,635,089 B1 * | 10/2003 | Burkett et al. | ............. | 715/513 |
| 6,640,241 B1 * | 10/2003 | Ozzie et al. | ............. | 709/204 |
| 6,654,793 B1 * | 11/2003 | Wollrath et al. | ............. | 709/217 |
| 6,671,869 B1 * | 12/2003 | Davidson et al. | ............. | 716/17 |
| 6,735,630 B1 * | 5/2004 | Gelvin et al. | ............. | 709/224 |
| 6,745,208 B1 * | 6/2004 | Berg et al. | ............. | 707/201 |
| 6,766,368 B1 | 7/2004 | Jakobson et al. | | |
| 6,944,659 B1 | 9/2005 | Taggart et al. | | |

(Continued)

OTHER PUBLICATIONS

Murata, M, "XML Media Types", Jan. 2001, IBM Tokyo Research Lab, RFC 3023, pp. 1-37.*

(Continued)

*Primary Examiner*—Khanh Q. Dinh
*Assistant Examiner*—Backhean Tiv
(74) *Attorney, Agent, or Firm*—Shumaker & Sieffert, P.A.

(57) ABSTRACT

A network router management interface offers two different presentation modes for viewing configuration and operational information encoded in extensible markup language output obtained from a network router. The network router management interface provides an application programming interface (API) that permits client applications to formulate configuration and operational requests according to an extensible markup language, such as XML. In response to the configuration and operational requests submitted by a client application, the router produces XML output. On a selective basis, the user may elect to view or archive the XML output in either a rendered or unrendered format. In this manner, clients such as network administrators, installation technicians and applications developers can view raw XML output on a selective basis for use in development and debugging.

33 Claims, 6 Drawing Sheets

U.S. PATENT DOCUMENTS

| | | | |
|---|---|---|---|
| 6,947,440 B1* | 9/2005 | Chatterjee et al. | 370/429 |
| 2001/0043600 A1* | 11/2001 | Chatterjee et al. | 370/390 |
| 2001/0053947 A1* | 12/2001 | Lenz et al. | 700/117 |
| 2002/0016815 A1* | 2/2002 | Hardy et al. | 709/203 |
| 2002/0059429 A1* | 5/2002 | Carpenter et al. | 709/227 |
| 2002/0111972 A1* | 8/2002 | Lynch et al. | 707/523 |
| 2002/0124061 A1* | 9/2002 | Mossman | 709/220 |
| 2002/0143888 A1* | 10/2002 | Lisiecki et al. | 709/214 |
| 2002/0147974 A1* | 10/2002 | Wookey | 717/176 |
| 2002/0161852 A1* | 10/2002 | Allen et al. | 709/217 |
| 2002/0178241 A1* | 11/2002 | Eriksson | 709/222 |
| 2002/0178243 A1 | 11/2002 | Collins | |
| 2002/0191619 A1* | 12/2002 | Shafer | 370/401 |
| 2003/0005090 A1* | 1/2003 | Sullivan et al. | 709/220 |
| 2003/0028685 A1* | 2/2003 | Smith et al. | 709/328 |
| 2003/0028863 A1* | 2/2003 | Reichenthal | 717/135 |
| 2003/0158947 A1* | 8/2003 | Bloch et al. | 709/227 |
| 2003/0193426 A1* | 10/2003 | Vidal | 341/176 |
| 2004/0220882 A1* | 11/2004 | Suto et al. | 705/64 |
| 2004/0243929 A1* | 12/2004 | Jones et al. | 715/509 |

OTHER PUBLICATIONS

Hollenbeck, S., "Guidelines for the use of extensible markup language (xml) within IETF Protocols", Jan. 2003, Versign Inc., RFC 3470, pp. 1-27.*

Boyer, J., "XML-Signature Xpath Filter 2.0", Dec. 2003, PureEdge Solutions, RFC 3653, pp. 1-15.*

* cited by examiner

NETWORK MANAGEMENT INTERFACE WITH SELECTIVE RENDERING OF OUTPUT

TECHNICAL FIELD

The invention relates to computer networks and, more particularly, to managing network routers.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Devices within the network, often referred to as routers, maintain tables of routing information that describe available routes through the network. Each route defines a path between two locations on the network. Upon receiving an incoming data packet, the router examines header information within the packet to identify the destination for the packet. Based on the header information, the router accesses the routing table, selects an appropriate route for the packet and forwards the packet accordingly.

A router management interface provides access to software modules and other resources residing on the router. In particular, the router management interface permits various entities, such as human users and automated scripts, to configure the router and obtain operational information. Using the router management interface, the entities can make changes to the present router configuration and more efficiently manage router resources, policies and relationships with other routers. In addition, the router management interface provides access to a variety of information relating to router configuration, protocols, firewalls, interfaces, router chassis inventory, system parameters, routing policies, forwarding options, network flow statistics, error logs, and performance metrics.

SUMMARY

The invention provides a network router management interface with different presentation modes for viewing configuration and operational information encoded in extensible markup language output obtained from a network router. The network router management interface provides an application programming interface (API) that permits client applications to formulate configuration and operational requests according to an extensible markup language, such as XML. XML is one example of an extensible markup language in the class encompassed by the Standard Generalized Markup Language (SGML) specification, and will be described herein for purposes of illustration.

In response to the configuration and operational requests submitted by a client application, the router produces XML output. In operation, the client application ordinarily renders the XML output graphically or textually for viewing by a user or archival to a file. On a selective basis, however, the user may elect to view or archive the XML output in an unrendered format. In other words, the network router management interface can be configured to present, at the client's option, either the rendered XML output or the raw XML output. As an example, the network router management interface may, in response to a command from a client application, emit XML output for display in an unrendered format. In general, the network router management interface may emit substantially the same XML output in either mode, but include a command for the client application, following a client request to display unrendered output, indicating whether the XML output should be rendered or presented in an unrendered form.

In one embodiment, the invention provides a network router management interface comprising a client interface that receives, from a network router client, configuration requests and operational requests encoded with extensible markup language tags. A storage device stores a network management interface schema that maps the extensible markup language tags to configuration and operational information associated with software modules running on a network router. The software modules include a chassis software module that defines an inventory of components in the network router chassis, a device configuration software module that defines a physical configuration of the network router, and a routing protocol module that administers protocols supported by the network router. A management server software module parses the configuration requests and the operational requests received at the client interface and accesses the corresponding configuration and operational information associated with the chassis software module, the device configuration software module, and the routing control software module according to the network management interface schema. The management server module emits to the client interface replies encoded with extensible markup language tags according to the network management interface schema. In response to a selection made by a user, the management server module emits the replies for presentation in either a rendered or unrendered format.

In another embodiment, the invention provides a method comprising receiving, at a client interface of a network router, configuration requests and operational requests encoded with extensible markup language tags. The method further includes accessing a network management interface schema that maps the extensible markup language tags to configuration and operational information associated with software modules running on a network router. The software modules include a chassis software module that defines an inventory of components in the network router chassis, a device configuration software module that defines a physical configuration of the network router, and a routing protocol module that administers protocols supported by the network router. The method also involves parsing the configuration requests and the operational requests, and accessing the corresponding configuration and operational information associated with the chassis software module, the device configuration software module, and the routing control software module according to the network management interface schema. In addition, the method includes communicating, to a network router client, replies encoded with extensible markup language tags according to the network management interface schema and, in response to a selection made by a user, emitting the replies for presentation in either a rendered or unrendered format. A computer-readable medium that carries instructions for performing such a method is also contemplated.

In an added embodiment, the invention provides a system comprising a client interface to transmit configuration requests and operational requests encoded with extensible markup language tags to a network router, and receive replies encoded with extensible markup language tags from the network router, and a management server module that emits the replies to a user for presentation in either a rendered or unrendered form in response to a selection made by the user.

In a further embodiment, the invention provides a method comprising transmitting configuration requests and operational requests encoded with extensible markup language tags to a network router, receiving replies encoded with extensible markup language tags from the network router, and presenting the replies to a user in either a rendered or unrendered form in response to a selection made by the user. A computer-readable medium that carries instructions for performing such a method is also contemplated.

A network router management interface and method consistent with the principles of the invention can provide a number of advantages. For example, at its option, a user can readily view unrendered XML output produced by the router. In particular, a client interface associated with the network router management interface can be configured to present replies to a user for presentation in either a rendered or unrendered form in response to a selection made by the user. When a client requests that XML output be displayed in an unrendered format, the network router management interface may respond by including with subsequent XML output a command that instructs the client application not to render the XML output. Thus, the XML output may be the same in either mode, but the response of the client application is different. In this manner, clients such as network administrators, installation and maintenance technicians and applications developers can view the raw XML output on a selective basis for use in development and debugging. With this capability, the user may be better equipped to trace the root of a problem and correct it.

The above summary of the invention is not intended to describe every embodiment of the invention. The details of one or more embodiments of the invention are set forth in the accompanying drawings and the description below. Other features, objects, and advantages of the invention will be apparent from the description and drawings, and from the claims.

DETAILED DESCRIPTION

Figure 1:
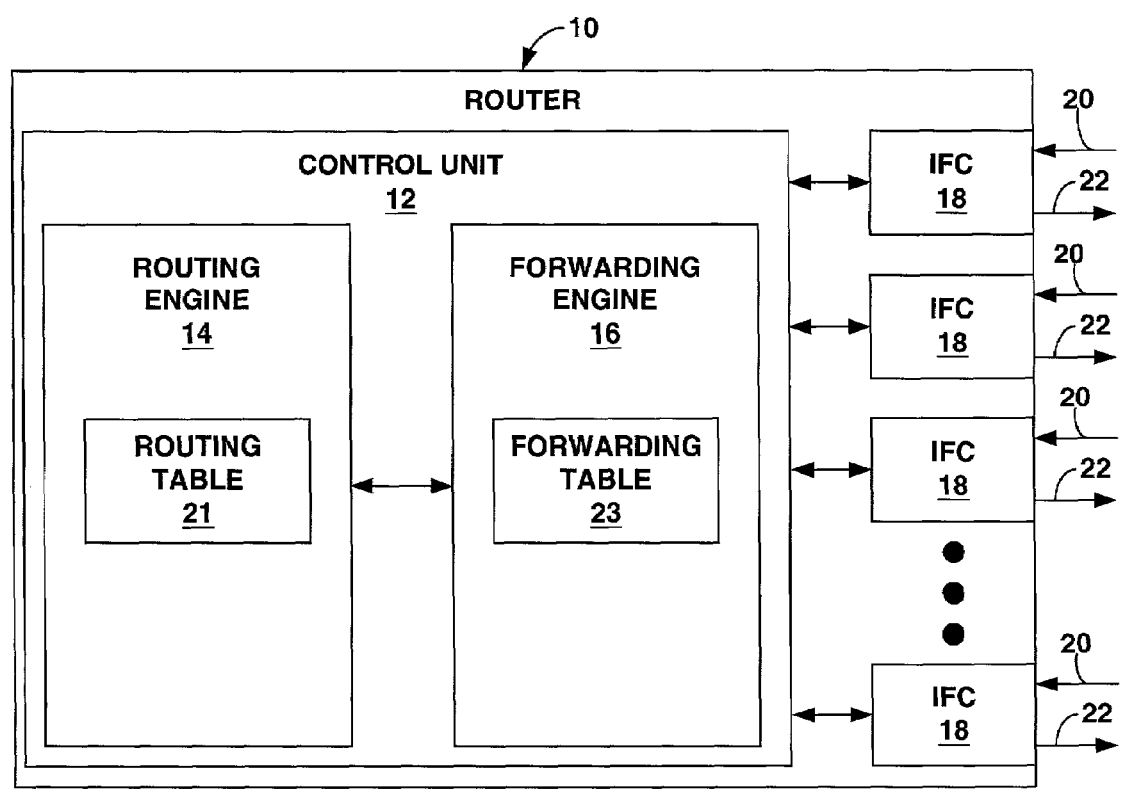
FIG. 1 is a block diagram illustrating an example network router.

FIG. 1 is a block diagram illustrating an example network router 10 appropriate for incorporation of a network router management interface in accordance with the principles of the invention. Network router 10 receives and forwards data packets across a network. As shown in FIG. 1, router 10 includes a control unit 12 with a packet routing engine 14 and a packet forwarding engine 16. Router 10 also includes one or more interface cards (IFCs) 18 for receiving and sending data packets via network links 20 and 22, respectively. Control unit 12 routes inbound packets received from inbound link 20 to the appropriate outbound link 22. Control unit 12 routes packets according to routing information stored in routing table 21, and may include a processor or other control logic. Instructions for causing a processor provided in router 10 to perform methods as described herein may be stored on any of a variety of computer readable media.

Routing engine 14 maintains and updates the routing information within routing table 21. Forwarding engine 16 analyzes the contents of routing table 21 prior to receiving packets and pre-selects routes to be used when forwarding packets. Forwarding engine 16 then stores the selected routes in forwarding table 23. Upon receiving an inbound packet, forwarding engine 16 examines information within the packet to identify the destination of the packet. Based on the destination, forwarding engine 16 selects an available route and forwards the packet to one of the IFCs 18. IFCs 18 may be configured according to one of several different network protocols.

As discussed in detail below, control unit 12 provides a network router management interface with two different output modes for viewing configuration and operational information encoded in extensible markup language output obtained from a router. The network router management interface provides an application programming interface (API) that permits client applications to formulate configuration and operational requests according to an extensible markup language, such as XML.

In response to the configuration and operational requests submitted by a client application, router 10 produces XML output. At the user's election, the client application either renders the XML output graphically or textually or presents XML output in an unrendered format, i.e., a format that permits the user to view the raw XML tags associated with the output. In this manner, clients such as network administrators, installation and maintenance technicians and applications developers can view the raw XML output on a selective basis for use in development and debugging.

Figure 2:
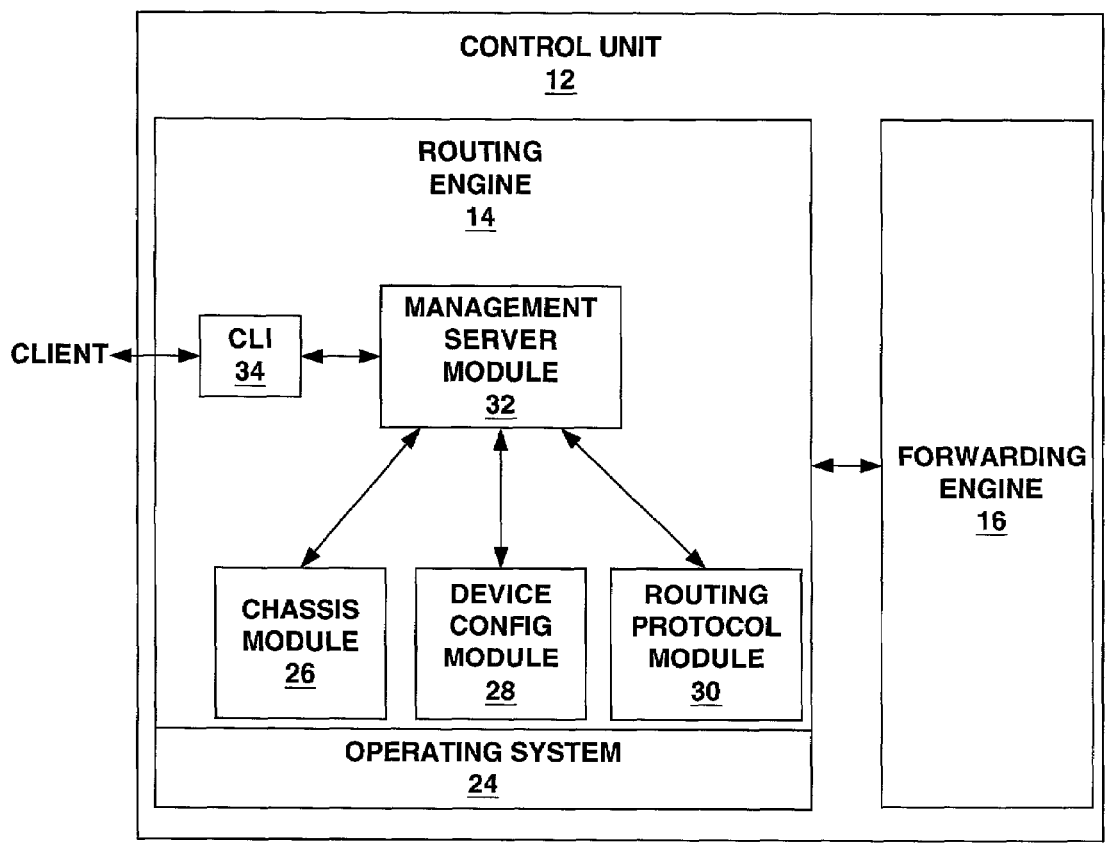
FIG. 2 is a block diagram illustrating a router control unit incorporating a management interface.

FIG. 2 is a block diagram illustrating an example router control unit 12 incorporating a network router management interface consistent with the principles of the invention. In the example of FIG. 2, control unit 12 includes packet routing engine 14 and packet forwarding engine 16. Within control unit 12, routing engine 14 provides a network router management interface that interacts with a number of software modules running within an operating environment provided by operating system 24. Operating system 24 provides a multi-tasking operating system for execution of a number of concurrent processes. An example of such an operating system is FreeBSD, which is an advanced UNIX operating system that is compatible with a number of programmable processors (not shown), including processors commercially available from Intel Corporation.

As examples, routing engine 14 may include a chassis module 26, a device configuration module 28, and a routing protocol module 30 running as processes within the operating environment of operating system 24. A management server module 32 provides a user interface for interaction with software modules 26, 28, 30. Chassis module 24 defines an inventory and status of components installed in the chassis of network router 10, including IFCs 18. Device configuration module 28 defines and controls the physical configuration of network router 10. Routing protocol module 30 administers protocols supported by network router 10. For example, routing protocol module 30 may implement protocols for exchanging route information with other routing devices and for updating routing table 21 (shown in FIG. 1).

Management server module 32 communicates with one or more client interface modules running on routing engine 14. In the example of FIG. 2, management server module 32 communicates with a command line interface (CLI) module 34. Together, management server module 32 and CLI module 34 form a network router management interface. CLI module 34 serves as a daemon process that listens for requests from clients. In some embodiments, CLI module 34 may give way to direct communication between clients and management server module 32, e.g., via script commands such as JUNOScript commands. The clients may take the form of human users such as system administrators or automated script applications. Initially, CLI module 34 listens for CLI commands, and passes them to management server module 32 for handling. Management server module 32, however, may dynamically replace CLI module 34 presented by control unit 12 with an XML-based API upon receipt of a particular CLI command from a client. More specifically, management server module 32 redirects incoming commands from CLI module 34 and services them based on the XML-based API.

Figure 3:
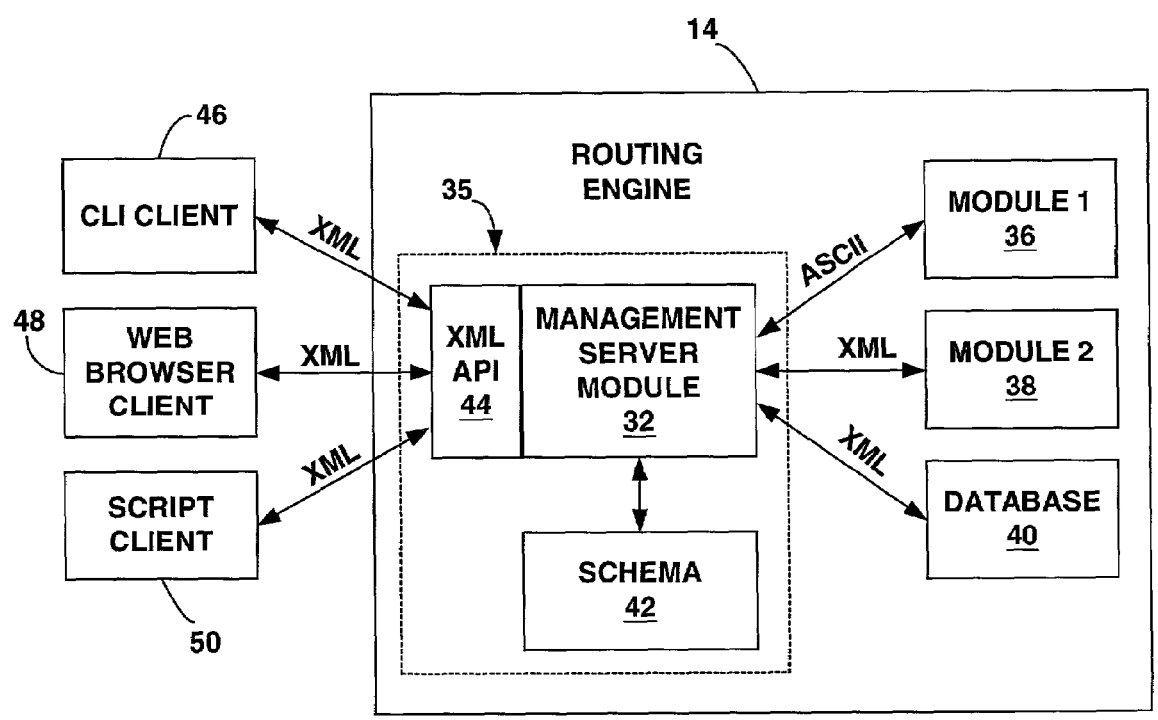
FIG. 3 is a block diagram illustrating a packet routing engine incorporating a management interface that presents an XML-based API.

FIG. 3 is a block diagram illustrating a packet routing engine 14 for a network router incorporating a management interface that supports an XML-based API.

A network router management interface providing an XML-based API suitable for use with the invention is described, for example, in U.S. patent application Ser. No. 09/871,458, to Philip Shafer, filed May 31, 2001, entitled "NETWORK ROUTER MANAGEMENT INTERFACE WITH API INVOKED VIA LOGIN STREAM," the entire content of which is incorporated herein by reference.

XML is one example of an extensible markup language in the class encompassed by the Standard Generalized Markup Language (SGML) specification, and will be described herein for purposes of illustration. The official XML specification is governed by the World Wide Web Consortium and is available on the web at http://www.w3.org/TR/REC-xml. The structure of the XML tags communicated via the XML API may be defined using Data Type Definition (DTD) files, XML Schema Language files, or other similar devices for XML tag definition. As an example, the XML tags may conform to the evolving JUNOScript™ API developed by Juniper Networks, Inc. of Sunnyvale, Calif. The JUNOScript™ API is described, for example, in JUNOScript™ API Guide and Reference, Version 4.3, available from Juniper Networks, Inc., the entire content of which is incorporated herein by reference.

In the example of FIG. 3, management server module 32 accesses one or more software modules 36, 38 running on routing engine 14, as well as other router resources such as router configuration database 40, to serve client requests. Software modules 36, 38 may include a variety of software modules such as chassis module 26, device configuration module 28, and routing protocol module 30 as described with reference to FIG. 2. Router configuration database 40 may store information associated with software modules 36, 38 and router hardware such as configuration information. Management server module 32 may obtain operational information from software module 36, 38, indicating operational status of the router. A management interface schema 42 maps extensible markup language tags received by management server module 32 to information associated with software modules 36, 38, including the information in configuration database 40 and information that may be obtained directly from software modules 36, 38. Network management schema 42 may take the form of a data definition language (DDL) file, and can be stored on hard disk or other data storage media associated with packet routing engine 14.

Management server module 32 presents an XML API 44. A variety of clients such as CLI client 46, web browser client 48, or script client 50 may establish independent communication sessions with management server module 32 via XML API 44. Management server module 32 and XML API 44 together present a network router management interface 35. CLI client 46 may take the form of a remote computer operated by a human user who enters CLI commands encoded with XML tags that conform to the API. In this case, the client application running on CLI client 46 may render the XML output received from management server module 32 as command line output, e.g., in a textual form. Web browser client 48 may graphically render the XML output for human users, e.g., using style sheets communicated or identified by management server module 32 with particular XML replies. Script client 50 may take the form of an automated script application running on a remote client computer, and may render XML output into reports, logs, and the like. In addition, script client 50 may respond to XML replies with additional requests according to script code loaded into the script client.

In operation, management server module 32 receives both configuration requests and operational requests encoded with XML tags from clients 46, 48, 50. Configuration requests include requests to change router configuration or obtain information about the current configuration. Management server module 32 can make changes to the router configuration by modifying configuration records in database 40. The configuration information may be stored hierarchically in database 40, which may reside on a hard disk or other data storage medium. Operational requests include requests for information about router status such as network flow and performance. Management server module 32 can obtain operational information from database 40 or directly from modules 36, 38.

Management server module 32 serves requests received from clients 46, 48, 50 by parsing the extensible markup language tags, and accessing schema 42 to map the tags to pertinent configuration or operational information associated with modules 36, 38, database 40, or both. The tags may include, for example, chassis tags pertaining to information about the chassis components installed in the router chassis, device configuration tags pertaining to information about the physical configuration of the network router, and routing protocol tags pertaining to information about the protocols supported by the network router. Upon accessing the corresponding configuration and operational information according to the network management interface schema, management server module 32 emits replies encoded with extensible markup language tags.

With further reference to FIG. 3, management server module 32 may receive output from software modules 36, 38 or database 40 in either XML or ASCII format. In particular, some of the router resources 36, 38, 40 may be configured to emit XML-encoded output, while others may simply emit ASCII output. When management server module 32 receives XML-encoded output, it may simply act as a conduit and communicate the output to a client 46, 48, 50, or include additional XML tags to further encode and integrate the XML-encoded output received from router resources 36, 38, 40. If management server module 32 receives ASCII output, however, it can be configured to encode the ASCII output with XML tags before sending it to a client application 46, 48, 50. Thus, in some instances, management server module 32 may "wrap" the ASCII output in XML tags to present replies that conform to XML API 44. Management server module 32 may access one or more DTD or XML Schema Language files for router 10 to ensure that the tags conform.

Clients 46, 48, 50 parse the respective XML replies, extract pertinent information, and present the XML output as specified by the client application. Consistent with the principles of the invention, clients 46, 48, 50 either render the XML output graphically or textually, or present the XML output in a raw, unrendered format, dependent on the nature of the replies emitted by management server module 32. Client applications 56, 58, 60 may parse the XML tags in the replies using a parser that implements a standard API such as the Document Object Model (DOM) or Simple API for XML (SAX). DOM implementations are available for several programming languages, including C, C++, Perl, and Java. Management server module 32 may parse the requests using a similar API. XML API 44 greatly facilitates the parsing of requests and replies. Tag names and structural rules provided by a DTD or XML Schema Language file make the tag streams highly structured and predictable.

The following are some examples of operational and configuration requests made by client applications 46, 48, 50 according to XML API 44 and corresponding replies emitted by management server module 32. The examples are from the JUNOScript™ API. Again, an operational request may be a request for information about router status. As a first example, the following request is for detailed information about a router interface called "ge-2/3/0":

```
<rpc>
    <get-interface-information>
        <interface-name>ge-2/3/0</interface-name>
        <detail/>
    </get-interface-information>
</rpc>
```

The above request opens and closes with the <rpc> tag, which encapsulates all client requests. The <get-interface-information> tags specify a class of information, while <interface-name>ge-2/3/0</interface-name> designates a specific interface. The tag <detail/> designates the amount of detail desired in the reply. If less detail is required, a tag such as <terse/> could be used.

The reply from management server module 32 for the operational request described above provides reply tags for all of the request tags, as specified by XML API 44. For example, management server module 32 returns the information requested by the <get-interface-information> tag in a response tag called <interface-information>, and the information requested by the <get-chassis-inventory> tag in a response tag called <chassis-inventory>. The following sample reply includes information about the interface called "ge-2/3/0":

```
<rpc-reply>
    <interface-information>
        <interface-name>ge-2/3/0</interface-name>
        <interface-index>20</interface-index>
        .
        .
        .
    <interface-information>
</rpc-reply>
```

In this example, each reply provided by management server module 32 includes the opening and closing tags <rpc-reply> and </rpc-reply>. Note that a large number of child tags may be included in the reply, as indicated by the ellipsis above.

The client application associated with a client 46, 48, 50 is configured to accept user input that specifies whether the XML reply from management server module 32 should be rendered or presented in an unrendered format. If rendered output is desired, the above reply could be displayed in any graphical or textual format as follows:

Interface Name: ge-2/3/0
Interface Index: 20

.
.
.

If unrendered output is desired, however, the client application simply presents the raw XML output communicated by management server module 32 as follows:

```
<rpc-reply>
    <interface-information>
        <interface-name>ge-2/3/0</interface-name>
        <interface-index>20</interface-index>
        .
        .
        .
    </interface-information>
</rpc-reply>
```

The user may enter a command that selects one of the presentation modes. For example, a user or script may enter a command or pipe such as |display xml| at the command line interface. The |display xml| pipe is communicated to management server module 32. Such a command or pipe indicates to management server module 32 that subsequent XML output is to be presented in a raw, unrendered format. In particular, the |display xml| pipe may correspond to a built-in CLI command in management server module 32 that directs the CLI client application 46 not to render the next output. In this case, the CLI client application 46 does not render the tags from the next router output into text. In particular, management server module 32 may included the built-in command with the router output, instructing the CLI client application 46 not the render the XML output that follows the command. This "do not render" mode may continue until the end of the output emitted by management server module 32, i.e., the end of an rpc reply. Web browser client 48 and script client 50 may operate in a similar manner. For a web browser client 48, the user input may be provided via an input medium, such as a check-box, radio button, or the like, that can be selected to specify that the next reply from management server module 32 should be presented as unrendered XML output. For a script client 50, the user input takes the form of a command that is automatically generated from script code based on a script configuration set by the user. For example, a network administrator may desire that the script client application record raw XML for particular commands for use later in debugging or another analysis.

Typically, the client application may have a default mode in which all XML output is rendered by client 46, 48, 50. In this case, a |display xml| pipe, or other command, entered by the user overrides the default mode and instructs the management server module 32 to transmit output for presentation of the XML output with a command that specifies an unrendered format. In other cases, the client application may include no default mode, and require that the user select one of the modes at the beginning of a session. In general, management server module 32 emits substantially the same XML output in either case. Following the |display xml| pipe, however, the XML output produced by management server module 32 is accompanied by a command to the client application indicating that the XML output should not be rendered. The command may precede the XML output, and may be in effect for an entire rpc reply. In response, CLI client 46 does not render the XML output, and instead displays it in a raw, unrendered format.

Generally, a user associated with a CLI client 46 or web browser client 48 should be able to change the presentation mode during a session. When the client application is in render mode, for example, a user may provide user input that instructs management server module 32 to change modes. In this case, management server module 32 may stay in the requested mode until additional user input instructs otherwise. Alternatively, the mode change command could be interpreted to enter a different mode for only one, or a series of, requests, and then revert back to a default mode. In one embodiment, a CLI client 46 does not commence rendering again until it receives the next closed XML tag, e.g., </rpc reply>.

In any event, the user is able to selectively control the presentation mode of the client application to view either rendered XML output or raw, unrendered XML output. The presentation of raw, unrendered XML output may be advantageous to application developers, network administrators, and installation and maintenance technicians in development and debugging. If management server module 32 seems to be producing erroneous output, for example, analysis of the raw XML output may permit inspection of the output emitted by a particular software module 36, 38 or database 40. With this capability, the user may be better equipped to trace the root of a problem and correct it.

Figure 4:
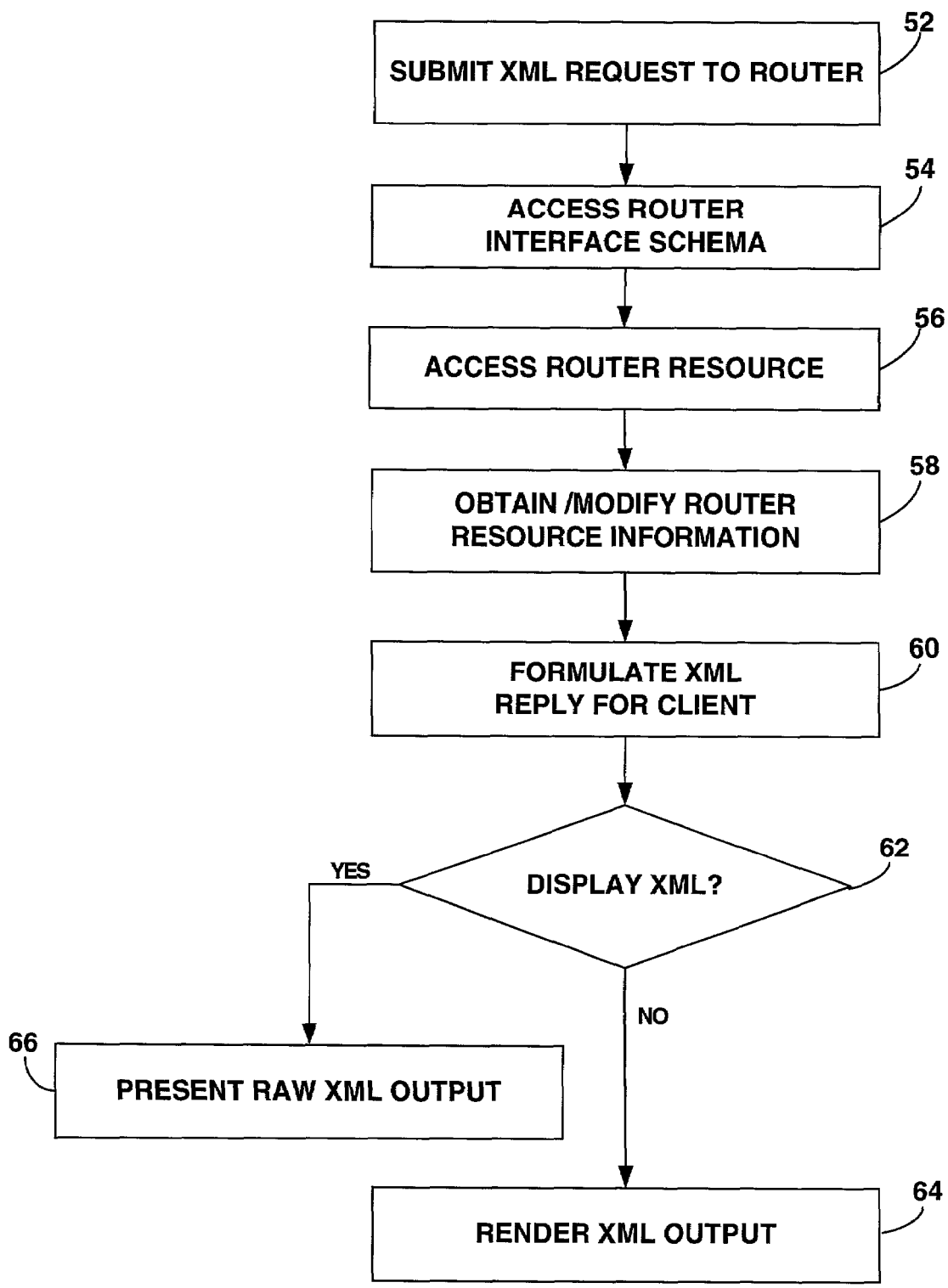
FIG. 4 is flow diagram illustrating a technique for selective rendering of XML output.

FIG. 4 is a flow diagram illustrating a technique for selective rendering of XML output. As shown in FIG. 4, the technique may involve submitting an XML request from a client 46, 48, 50 to network router 10 (52). Upon parsing the request, management server module 32 of router 10 accesses a router interface schema 42 to map the XML tags to particular resources associated with the information (54). Management server module 32 then accesses router resource 36, 38, 40 (56), obtains or modifies the pertinent information (58), and formulates an appropriate XML reply for client 46, 48, 50 (60). Alternatively, router resources 36, 38, 40 may asynchronously push operational and configuration information to management server module 32 in response to one or more events. Management server module 32 forwards the information to the appropriate client application 46, 48, 50.

Before emitting a reply to client 46, 48, or 50, management server module 32 determines whether it is in a presentation mode that requires rendering of the XML output or presentation of the XML output in a raw, unrendered format. For example, management server module 32 may determine whether a user has entered a command such as the |display xml| pipe (62). If not, management server module 32 emits a normal reply formulated for presentation as rendered XML output by the client application 46, 48, 50. The reply is not accompanied by a command that would instruct the client application to not render the XML output. Accordingly, in this case, the client application renders the XML output graphically or textually and presents the rendered output to the user via a display, archive file, or other output medium (64). If the user has entered a command such as the |display xml| pipe, however, management server module 32 emits a reply formulated for presentation of the output in an unrendered format. In particular, management server module 32 emits the same XML output, but may precede the output with a command that instructs the client application not to render the output. In this case, the client application 46, 48, 50 simply presents the XML output in a raw, unrendered form (66) for inspection by the user.

Figure 5:
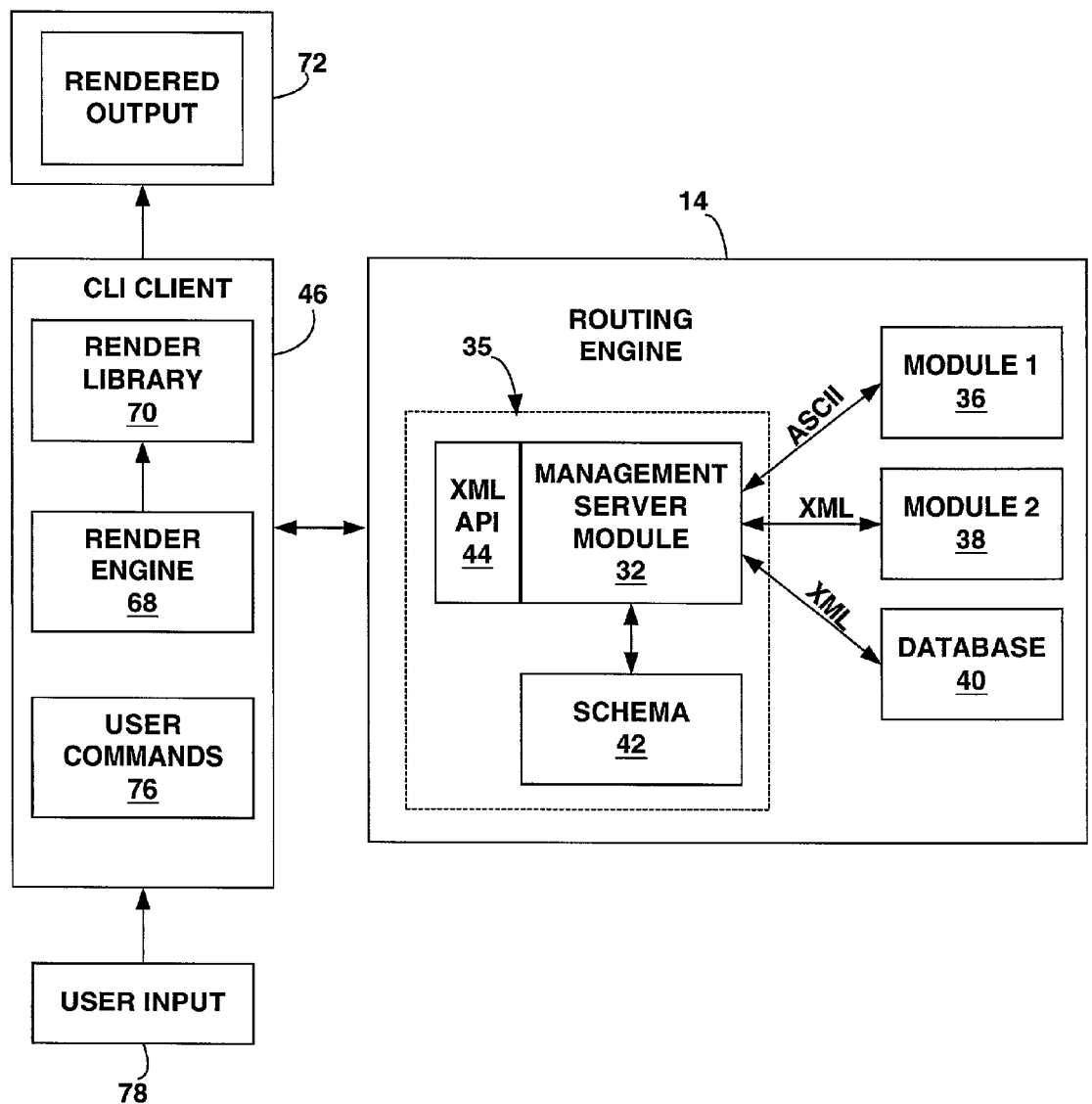
FIG. 5 is a block diagram depicting a network router management interface in communication with a command line interface (CLI) client.

FIG. 5 is a block diagram depicting a network router management interface in communication with a CLI client 46 for purposes of illustration. In general, the network router management interface includes software modules residing on router 10 for interaction with client applications such as CLI client 46. As shown in FIG. 5, CLI client 56 may include a render engine 68, render library 70, and a display device 72 for displaying rendered output. Render engine 68 parses the XML replies received from management server module 32, and renders the extracted information to a human-readable format using render library 70. Render library 70 may contain style sheets, object definition language (ODL) files, and the like, necessary to textually or graphically render the XML output on display device 72. In some instances, the output may simply be rendered as text at the command line, archived to a file, printed, or presented on another type of output medium. In addition, CLI client 46 receives user input 78 and directs user commands 76 to routing engine 14. User input 78 may take the form of keystrokes, mouse clicks and the like, as entered by a human user associated with a machine executing CLI client application 46.

Figure 6:
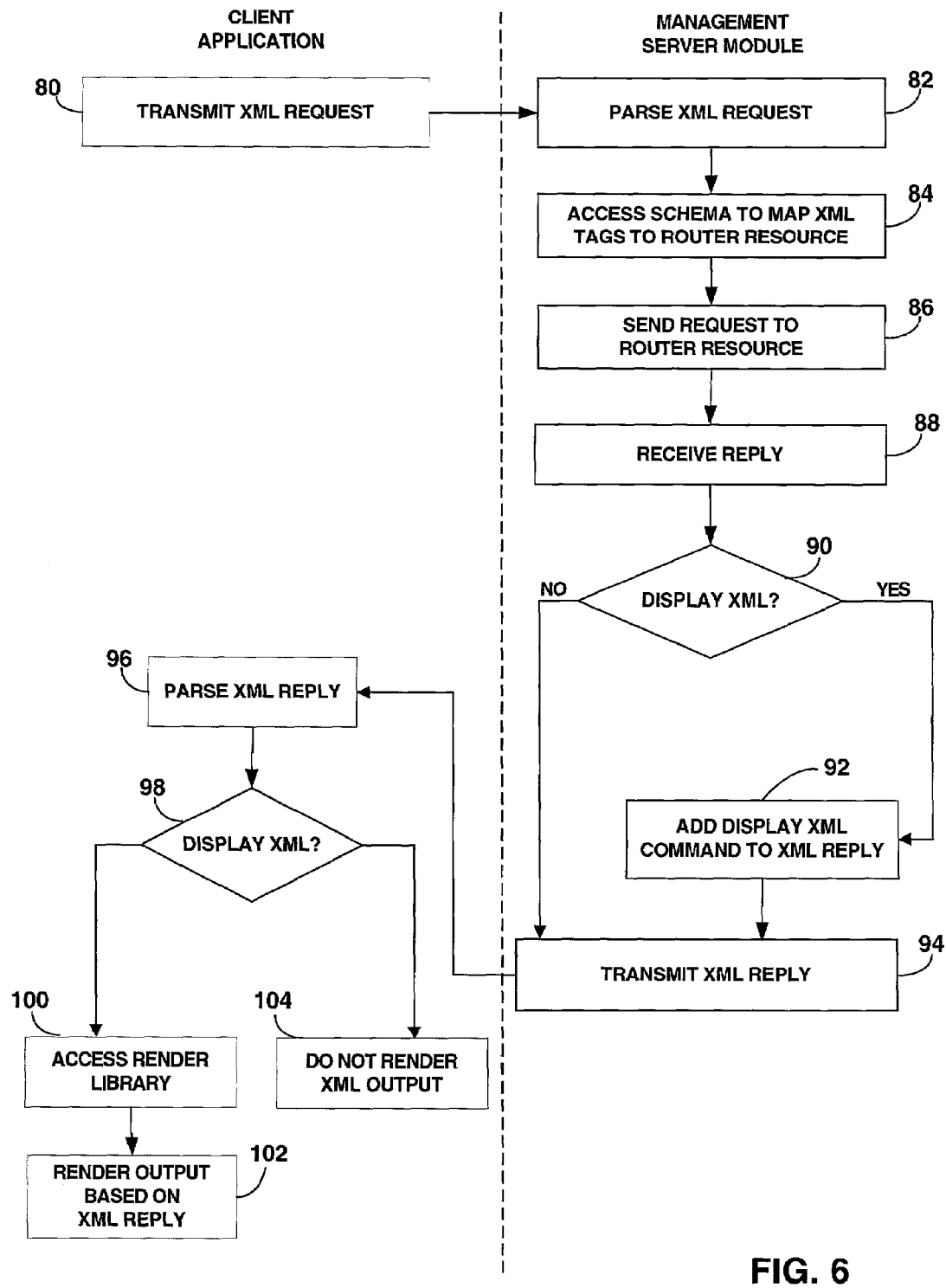
FIG. 6 is a flow diagram illustrating interaction between a client application and a management server module on a network router.

FIG. 6 is a flow diagram illustrating interaction between a client application and a management server module executing on a network router. As shown in FIG. 6, the client application transmits an XML request (80) via the XML API. Management server module 32 parses the XML request (82) and then accesses the network management interface schema to map the XML tags to information associated with particular router resources (84) such as software modules 36, 38 or configuration database 40 (FIG. 3). Upon identifying the source of the appropriate information, management server module 32 sends the request to a corresponding router resource (86).

Management server module 32 then receives a reply from the pertinent router resource (88). If management server module 32 receives an ASCII format reply from the router resource, it "wraps" the ASCII format reply in appropriate XML tags specified by the XML API 44. As an alternative, management server module 32 could include a translator that translates ASCII into corresponding XML tags based on a heuristic translation engine. If management server module 32 receives an XML-encoded reply, there may be no need for additional encoding. Alternatively, management server module 32 may include additional XML tags within the reply to further encode and integrate the XML-encoded output received from router resources 36, 38, 40.

In each case, management server module 32 transmits the XML-encoded reply to the client application. Management server module 32 first determines whether it is in a default mode or the 'display xml' mode (90). In the default mode, management server module 32 presents output for presentation by the client application in a rendered format. If the display xml mode applies, management server module 32 adds to the XML reply a command (92) that the client application should not render the XML reply. Instead, the client application should respond by preparing the XML reply for presentation in a raw, unrendered format. With the exception of the "display xml" indication, the XML output emitted by management server module 32 otherwise may be the same in both modes. If the 'display xml' mode does not apply, management server module 32 transmits the XML reply to the client application (94). The client application parses the XML reply (96). In the event the XML reply is not accompanied by a 'display xml' mode command (98), the client application accesses the render library (100) for rendering support, and renders output based on the contents of the XML reply (102) and any style sheets, ODL files, or other information provided by the render library. If the XML reply instructs the client application to present the XML reply in an unrendered format, the client application merely presents the XML code without additional textual or graphical rendering (104).

Various embodiments of the invention have been described. These and other embodiments are within the scope of the following claims.

The invention claimed is:

1. A network router management interface comprising:
a client interface that receives, from a network router client, configuration requests and operational requests encoded with extensible markup language tags;
a storage device storing a network management interface schema that maps the extensible markup language tags to configuration and operational information associated with software modules running on a network router, the software modules including a chassis software module that defines an inventory of components in the network router chassis, a device configuration software module that defines a physical configuration of the network router, and a routing protocol module that administers protocols supported by the network router;
a management server software module that parses the configuration requests and the operational requests received at the client interface and accesses the corresponding configuration and operational information associated with the chassis software module, the device configuration software module, and the routing control software module according to the network management interface schema, and emits to the client interface replies encoded with extensible markup language tags according to the network management interface schema, wherein the management server module, in response to a selection made by a user, emits the replies for presentation in either a rendered or unrendered format.

2. The network router management interface of claim 1, wherein the tags include chassis tags that define output for the chassis software module, device configuration tags that define output for the device configuration software module, and routing protocol tags that define output for the routing protocol software module.

3. The network router management interface of claim 1, wherein the management server module receives at least some of the replies encoded with extensible markup language tags from one or more of the software modules.

4. The network router management interface of claim 1, wherein the management server module encodes at least some of the replies with extensible markup language tags based on non-encoded replies received from one or more of the software modules.

5. The network router management interface of claim 4, wherein the non-encoded replies include ASCII replies, the management server module encoding the ASCII replies in extensible markup language tags to form the encoded replies.

6. The network router management interface of claim 1, wherein the selection made by the user includes user input received at the client interface indicating a desire to present the replies in an unrendered form.

7. The network router management interface of claim 1, wherein the management server module emits the replies in a default mode unless the selection made by the user overrides the default mode.

8. The network router management interface of claim 7, wherein the management server module includes with the replies an indication that the replies are not to be rendered when the user overrides the default mode.

9. The network router management interface of claim 1, wherein the configuration requests include requests to change an existing configuration of the network router, the management server module interacting with one or more of the software modules to effect the requested change.

10. The network router management interface of claim 1, wherein the extensible markup language is XML, and the client interface presents an XML-based application programming interface (API).

11. The network router management interface of claim 1, wherein the network router includes a packet routing engine that specifies one or more routes for data packets, and a packet forwarding engine that forwards the data packets according to the specified routes, and the management server module is a process within an operating environment executing on the packet routing engine.

12. A method comprising:
receiving, at a client interface of a network router, configuration requests and operational requests encoded with extensible markup language tags;
accessing a network management interface schema that maps the extensible markup language tags to configuration and operational information associated with software modules running on a network router, the software modules including a chassis software module that defines an inventory of components in the network router chassis, a device configuration software module that defines a physical configuration of the network router, and a routing protocol module that administers protocols supported by the network router;
parsing the configuration requests and the operational requests;
accessing the corresponding configuration and operational information associated with the chassis software module, the device configuration software module, and the routing control software module according to the network management interface schema;
communicating, to a network router client, replies encoded with extensible markup language tags according to the network management interface schema; and in response to a selection made by a user, emitting the replies for presentation in either a rendered or unrendered format.

13. The method of claim 12, wherein the tags include chassis tags that define output for the chassis software module, device configuration tags that define output for the device configuration software module, and routing protocol tags that define output for the routing protocol software module.

14. The method of claim 12, further comprising receiving at least some of the replies encoded with extensible markup language tags from one or more of the software modules.

15. The method of claim 12, further comprising encoding at least some of the replies with extensible markup language tags based on non-encoded replies received from one or more of the software modules.

16. The method of claim 15, wherein the non-encoded replies include ASCII replies, the method further comprising encoding the ASCII replies in extensible markup language tags to form the encoded replies.

17. The method of claim 12, wherein the selection made by the user includes user input received at the client interface indicating a desire to present the replies in an unrendered form.

18. The method of claim 12, further comprising emitting the replies in a default mode unless the selection made by the user overrides the default mode.

19. The method of claim 18, further comprising including with the replies an indication that the replies are not to be rendered when the user overrides the default mode.

20. The method of claim 12, wherein the configuration requests include requests to change an existing configuration of the network router, the method further comprising interacting with one or more of the software modules to effect the requested change.

21. The method of claim 12, wherein the extensible markup language is XML, the method further comprising presenting an XML-based application programming interface (API) at the client interface.

22. The method of claim 12, wherein the network router includes a packet routing engine that specifies one or more routes for data packets, and a packet forwarding engine that forwards the data packets according to the specified routes, and the method is performed in part as a process within an operating environment executing on the packet routing engine.

23. A computer-readable medium carrying instructions to cause a programmable processor to:
receive, at a client interface of a network router, configuration requests and operational requests encoded with extensible markup language tags;
access a network management interface schema that maps the extensible markup language tags to configuration and operational information associated with software modules running on a network router, the software modules including a chassis software module that defines an inventory of components in the network router chassis, a device configuration software module that defines a physical configuration of the network router, and a routing protocol module that administers protocols supported by the network router;
parse the configuration requests and the operational requests;
access the corresponding configuration and operational information associated with the chassis software module, the device configuration software module, and the routing control software module according to the network management interface schema;
communicate, to a network router client, replies encoded with extensible markup language tags according to the network management interface schema; and
in response to a selection made by a user, emit the replies for presentation in either a rendered or unrendered format.

24. The computer-readable medium of claim 23, wherein the tags include chassis tags that define output for the chassis software module, device configuration tags that define output for the device configuration software module, and routing protocol tags that define output for the routing protocol software module.

25. The computer-readable medium of claim 23, wherein the instructions cause the processor to receive at least some of the replies encoded with extensible markup language tags from one or more of the software modules.

26. The computer-readable medium of claim 23, wherein the instructions cause the processor to encode at least some of the replies with extensible markup language tags based on non-encoded replies received from one or more of the software modules.

27. The computer-readable medium of claim 26, wherein the non-encoded replies include ASCII replies, and the instructions cause the processor to encode the ASCII replies in extensible markup language tags to form the encoded replies.

28. The computer-readable medium of claim 23, wherein the selection made by the user includes user input received at the client interface indicating a desire to present the replies in an unrendered form.

29. The computer-readable medium of claim 23, wherein the instructions cause the processor to emit the replies in a default mode unless the selection made by the user overrides the default mode.

30. The computer-readable medium of claim 29, wherein the instructions cause the processor to emit with the replies an indication that the replies are not to be rendered when the user overrides the default mode.

31. The computer-readable medium of claim 23, wherein the configuration requests include requests to change an existing configuration of the network router, and the instructions cause the processor to interact with one or more of the software modules to effect the requested change.

32. The computer-readable medium of claim 23, wherein the extensible markup language is XML, and the instructions cause the processor to present an XML-based application programming interface (API) at the client interface.

33. The computer-readable medium of claim 23, wherein the network router includes a packet routing engine that specifies one or more routes for data packets, and a packet forwarding engine that forwards the data packets according to the specified routes, and wherein the instructions cause the processor to execute a process within an operating environment executing on the packet routing engine.

* * * * *

UNITED STATES PATENT AND TRADEMARK OFFICE
CERTIFICATE OF CORRECTION

PATENT NO. : 7,054,901 B2  Page 1 of 1
APPLICATION NO. : 09/871046
DATED : May 30, 2006
INVENTOR(S) : Philip Shafer It is certified that error appears in the above-identified patent and that said Letters Patent is hereby corrected as shown below:

On Column 8, line 9, "<interface-information>" should read
--</interface-information>--

Signed and Sealed this

Eighth Day of May, 2007

JON W. DUDAS
*Director of the United States Patent and Trademark Office*